(12) United States Patent
Chiu

(10) Patent No.: US 6,279,509 B1
(45) Date of Patent: Aug. 28, 2001

(54) PIGSTY WITH AN EXCRETION AREA

(76) Inventor: Shung-Tien Chiu, No. 168-8, Wei-Hsin Rd., Hsin-Erh Tsun, Yen-Pu Hsiang, Ping-Tung Hsien (TW)

( * ) Notice: Subject to any disclaimer, the term of this patent is extended or adjusted under 35 U.S.C. 154(b) by 0 days.

(21) Appl. No.: 09/576,874

(22) Filed: May 22, 2000

(30) Foreign Application Priority Data

Apr. 7, 2000 (TW) .................................. 89205550

(51) Int. Cl.⁷ .................................. A01K 1/02; A01K 1/00
(52) U.S. Cl. .................................. 119/509; 119/525
(58) Field of Search .................................. 119/502, 503, 119/509, 525, 527, 529

(56) References Cited

U.S. PATENT DOCUMENTS

| | | | |
|---|---|---|---|
| 3,905,334 | * 9/1975 | Stevenson | 119/509 |
| 4,183,324 | * 1/1980 | Nobbe | 119/509 |
| 4,976,221 | * 12/1990 | Yetter | 119/509 |
| 5,596,951 | * 1/1997 | Lagadec | 119/525 |
| 5,749,322 | * 5/1998 | Chagnon | 119/509 |

* cited by examiner

Primary Examiner—Charles T. Jordan
Assistant Examiner—Elizabeth Shaw
(74) Attorney, Agent, or Firm—Akin, Gump, Strauss, Hauer & Feld, L.L.P.

(57) ABSTRACT

A pigsty includes a horizontal base member and a fence member extending upwardly from the base member and cooperating with the base member to confine a raising space adapted for accommodating and raising pigs therein. The base member is configured to have an excretion area within the raising space. The excretion area is provided with a plurality of upward projections. The distance between two adjacent ones of the upward projections is substantially shorter than the width of each of the pigs raised in the raising space so as to be adapted to prevent the pigs from lying down on the excretion area.

6 Claims, 3 Drawing Sheets

PIGSTY WITH AN EXCRETION AREA

BACKGROUND OF THE INVENTION

1. Field of the Invention

The present invention relates to a pigsty with an excretion area that can prevent the bodies of pigs raised in the pigsty from touching excrement in the excretion area in order to result in an enhanced sanitary effect.

2. Description of the Related Art

A conventional pigsty is generally built from concrete, and includes a surrounding wall rising from a ground surface so as to confine a raising space for accommodating pigs therein. It has been found that a pig can follow a stinking smell of excrement diffused from a certain excretion area, and can have a natural reaction of excreting at said area. However, in the conventional pigsty, there is generally a relatively large number of pigs accommodated in a relatively small raising space. The pigs eat, sleep, and excrete within the same raising space everyday. As the pigs often lie down on the ground surface, their bodies can easily touch their own excrement and smear the excrement thereon. As such, there is always a stinking smell permeating through the whole raising space of the pigsty. It thus becomes difficult for the pigs in the pigsty to follow the stinking smell and excrete at a certain area. The excrement of the pigs is thus distributed within the raising space, and carried by the pigs on their bodies. The conventional pigsty is thus not satisfactory in view of sanitary considerations. In addition, a relatively large amount of water for cleaning the pigsty and the bodies of the pigs is always required.

SUMMARY OF THE INVENTION

Therefore, the object of the present invention is to provide a pigsty with an excretion area that can prevent the bodies of pigs raised in the pigsty from touching excrement in the excretion area to result in an enhanced sanitary effect.

Accordingly, the pigsty of the present invention includes a horizontal base member and a fence member which extends upwardly from the base member and which cooperates with the base member to confine a raising space that is adapted for accommodating and raising pigs therein. The base member is configured to have an excretion area within the raising space. The excretion area is provided with a plurality of upward projections that have a height sufficient to be adapted to allow the pigs to stand on the excretion area. The distance between two adjacent ones of the upward projections is substantially shorter than the width of each of the pigs raised in the raising space so as to be adapted to prevent the pigs from lying down on the excretion area.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
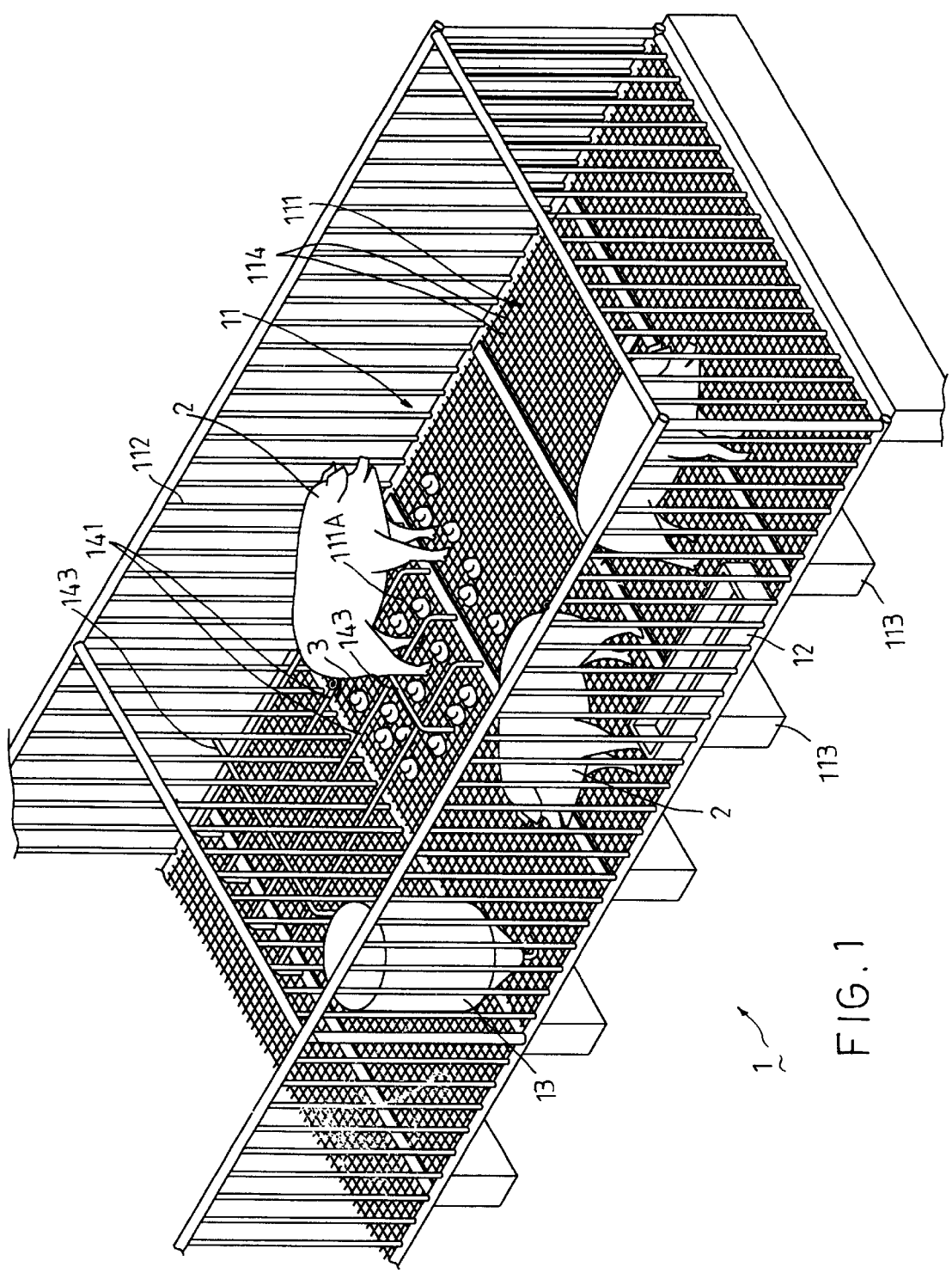
FIG. 1 is a perspective view illustrating a first preferred embodiment of a pigsty of the present invention.

Referring to FIG. 1, the first preferred embodiment of the pigsty 1 of the present invention is shown to include a horizontal base member 11 and a fence member 112 which extends upwardly from the base member 111 and which cooperates with the base member 111 to confine a raising space 11 adapted for accommodating and raising pigs 2 therein. A water tank 13 and a feed container 12 are provided in the raising space 11. The base member 111 is configured to have an excretion area 111A within the raising space 11. The excretion area 111A is provided with a plurality of upward projections which project upwardly from the base member 111. In the present embodiment, the upward projections are in the form of parallel first rod members 141 which project upwardly from the base member 111. Each of the first rod members 141 is inverted U-shaped, and includes parallel vertical sections with lower ends secured to the base member 111, and a horizontal section interconnecting upper ends of the vertical sections. The upward projections have a height sufficient to be adapted to allow the pigs to stand on the excretion area 111A. Moreover, the distance between two adjacent ones of the first rod members 141 is substantially smaller than the width of each of the pigs 2 raised in the raising space 11 so as to prevent the pigs 2 from lying down on the excretion area 111A. At least one second rod member 143 transverse to the first rod members 141 is secured on the base member 111 at the excretion area 111A. The second rod member 143 is also inverted Ushaped, and includes parallel vertical portions with lower ends secured to the base member 111, and a horizontal portion interconnecting upper ends of the vertical portions. The horizontal portion of the second rod member 143 is transverse to the horizontal sections of the first rod members 141. The base member 111 is formed with a plurality of drain holes 114 therethrough. A plurality of space-apart upright posts 113 are disposed below the base member 111, and have upper ends secured to the base member 111 and lower ends adapted to be supported on a ground surface for supporting the base member 111 above the ground surface.

In use, the excrement 3 discharged by the pigs 2 in the raising space 11 is moved to the excretion area 111A. With a relatively strong sense of smell, the pigs 2 can follow the stinking smell diffused from the excretion area 111A, and can have a natural reaction of excreting at the excretion area 111A. Since the excretion area 111A is provided with the upwardly projecting first rod members 141, the pigs 2 are able to stand on the excretion area 111A but are prevented from lying down on the excretion area 111A, thereby preventing the bodies of the pigs 2 from touching their excrement. Although the excrement 3 might be carried out of the excretion area 111A due to stepping by the pigs 2 thereon, the amount thereof is relatively small. As such, the excrement 3 can be concentrated in the excretion area 111A, and the remaining part of the base member 111 can be maintained relatively clean so as to provide an enhanced living environment to the pigs 2 raised in the raising space 11 and to keep the bodies of the pigs 2 more sanitary. During cleaning of the base member 111 with water, the resulting wastewater flows downward through the base member 111 via the drain holes 114. The amount of water required for cleaning the base member 111 and the bodies of the pigs 2 is significantly reduced when compared with the prior art, thus reducing the amount of the resulting wastewater.

Figure 2:
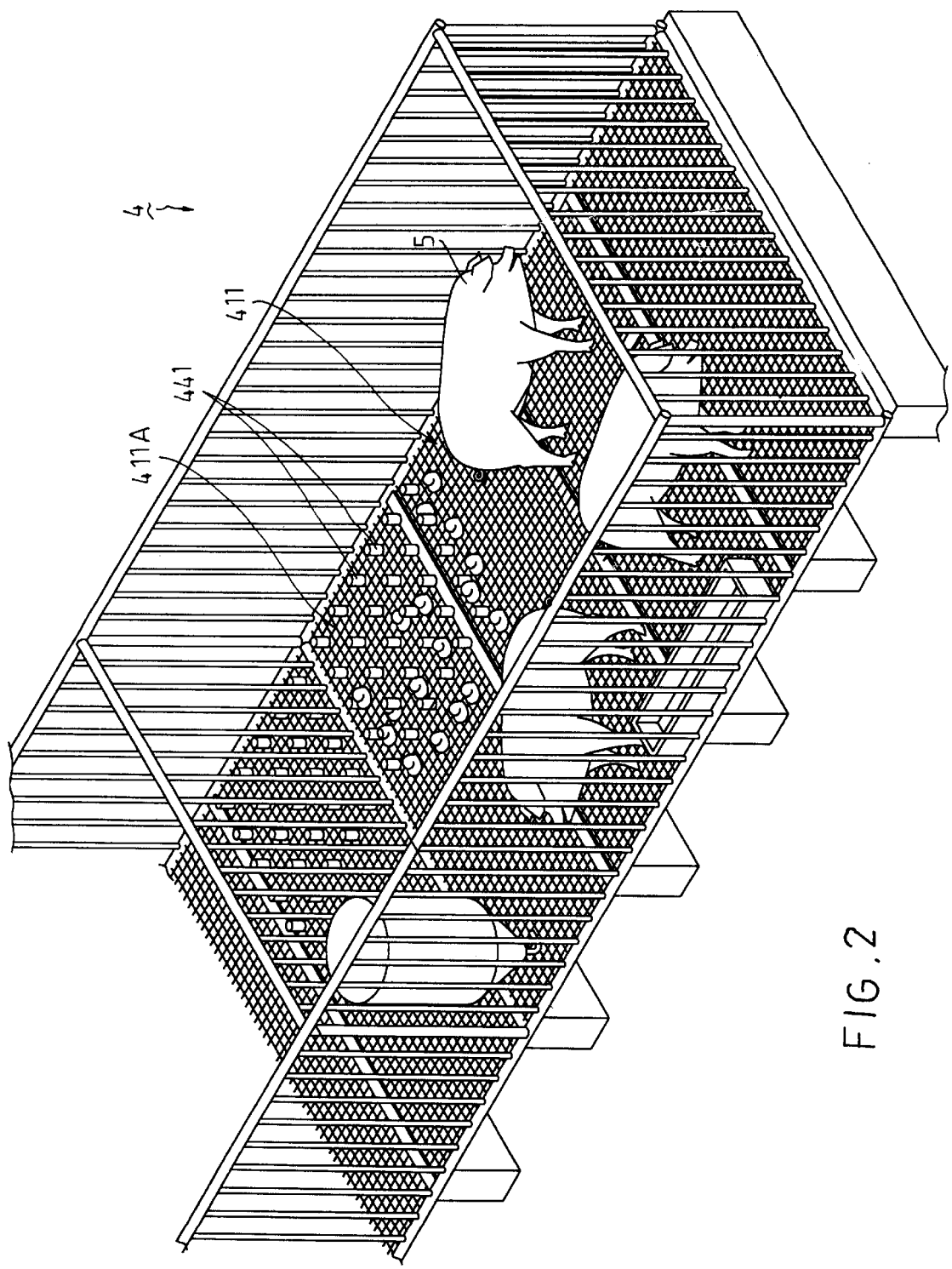
FIG. 2 is a perspective view illustrating a second preferred embodiment of the pigsty of the present invention.
Figure 3:
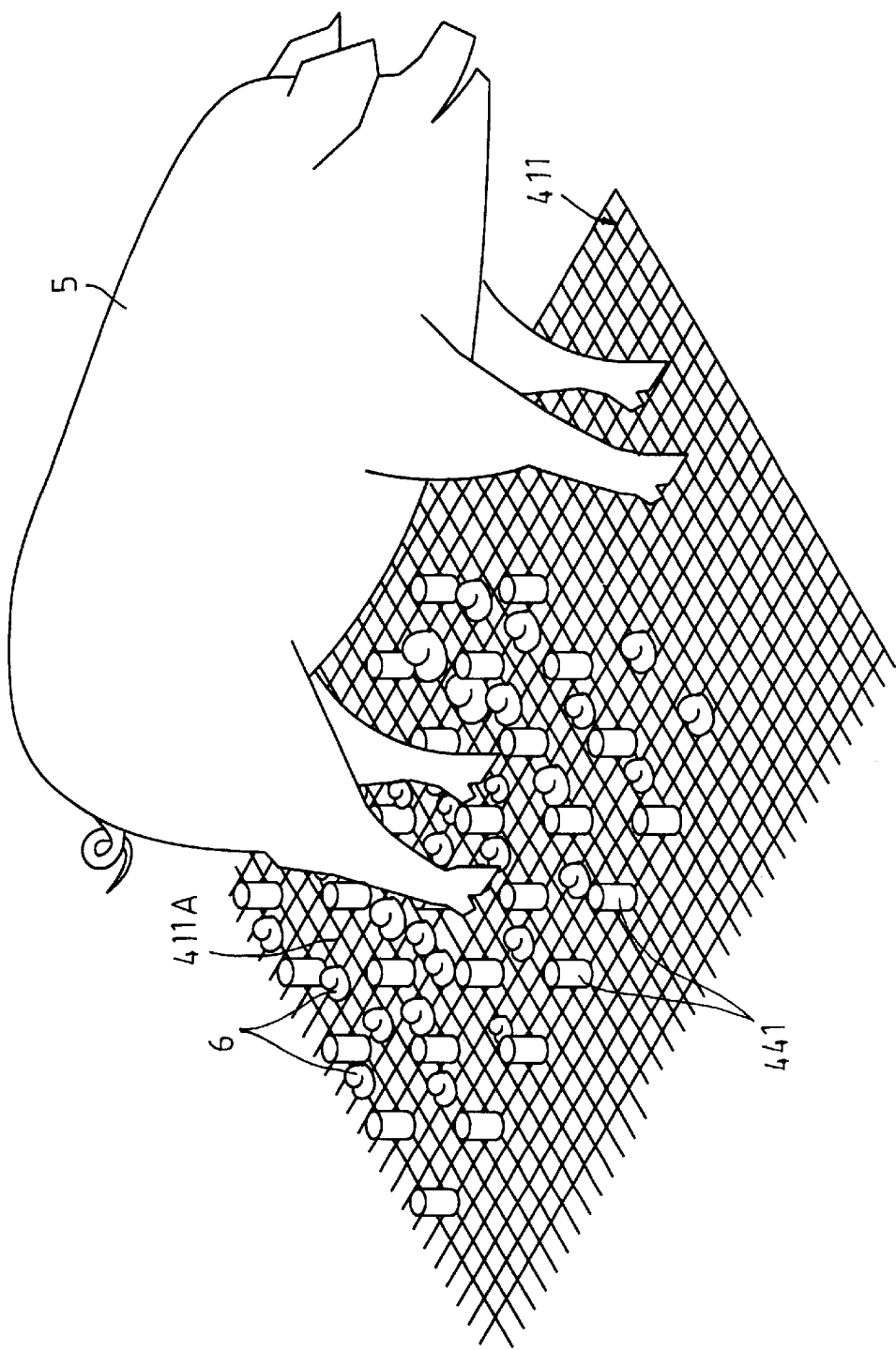
FIG. 3 is an enlarged fragmentary schematic view of the second preferred embodiment, illustrating how a pig can excrete at an excretion area of the pigsty of the second preferred embodiment.

Referring to FIGS. 2 and 3, the pigsty 4 of the second preferred embodiment is similar to that of the previous embodiment except for the upward projections which are formed as upright cylindrical projections 441 that project upwardly from an excretion area 411A of the base member 411. The cylindrical projections 441 have a height sufficient to be adapted to allow pigs 5 raised in the pigsty 4 to stand on the excretion area 411A. The distance between two adjacent ones of the cylindrical projections 441 is shorter than the width of each of the pigs 5 raised in the pigsty 4 so as to prevent the pigs 5 from lying down on the excretion area 411A, thereby preventing the bodies of the pigs 5 from touching excrement 6 at the excretion area 411A.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A pigsty comprising:

a horizontal base member; and a fence member extending upwardly from said base member and cooperating with said base member to confine a raising space adapted for accommodating and raising pigs therein, said base member being configured to have an excretion area within said raising space, said excretion area being provided with a plurality of upward projections that have a height sufficient to be adapted to allow the pigs to stand on the excretion area, the distance between two adjacent ones of said upward projections being substantially shorter than width of each of the pigs raised in said raising space so as to be adapted to prevent the pigs from lying down on said excretion area.

2. The pigsty according to claim 1, wherein said upward projections are formed as parallel first rod members, each of which is inverted U-shaped and includes two vertical sections that have lower ends secured to said base member, and a horizontal section interconnecting said vertical sections.

3. The pigsty according to claim 2, wherein said excretion area of said base member is further provided with at least one second rod member which has is inverted U-shaped and which includes two vertical portions secured to said base member, and a horizontal portion that interconnects said vertical portions and that extends in a direction transverse to said horizontal sections of said first rod members.

4. The pigsty according to claim 1, wherein said upward projections are formed as upright cylindrical projections.

5. The pigsty according to claim 1, further comprising a plurality of upright posts disposed below said base member, said posts being spaced-apart from each other and having upper ends secured to said base member and lower ends adapted to be supported on a ground surface for supporting said base member above the ground surface.

6. The pigsty according to claim 5, wherein said base member is formed with a plurality of drain holes.

* * * * *